(12) United States Patent
Yao et al.

(10) Patent No.: US 6,511,752 B1
(45) Date of Patent: Jan. 28, 2003

(54) WATER-BASED PRIMER FOR PROMOTING ADHESION OF POLYURETHANE-BASED SEALANTS AND ADHESIVES

(75) Inventors: Hong Yao, Clifton, NJ (US); Steven Rosenberg, Succasunna, NJ (US); Norman Blank, Wayne, NJ (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 09/584,685

(22) Filed: Jun. 1, 2000

(51) Int. Cl.⁷ .............. B32B 9/00; B32B 27/38; B05D 1/36
(52) U.S. Cl. ............... 428/429; 428/413; 428/414; 428/423.1; 428/428; 428/447; 428/448; 427/386; 427/387; 427/388.4; 427/407.2; 106/287.1; 106/287.13; 106/287.16; 106/287.19
(58) Field of Search ................. 428/413, 428, 428/429, 447, 448, 414, 423.1; 427/387, 386, 388.4, 389.7, 407.2; 106/287.11, 287.13, 287.16, 287.19, 287.1

(56) References Cited

U.S. PATENT DOCUMENTS

| | | |
|---|---|---|
| 3,702,783 A | 11/1972 | Hartlein |
| 4,332,844 A | 6/1982 | Hamada et al. |
| 4,490,526 A | 12/1984 | Amort et al. |
| 4,758,648 A | 7/1988 | Rizk et al. |
| 5,112,418 A | 5/1992 | Pike |
| 5,248,706 A | 9/1993 | Panster et al. |
| 5,326,844 A | 7/1994 | Fujiki et al. |
| 5,363,994 A * | 11/1994 | Angeline .............. 222/529 |
| 5,413,620 A | 5/1995 | Henry |
| 5,578,347 A | 11/1996 | Chan |
| 5,621,038 A | 4/1997 | Chen et al. |
| 5,728,203 A | 3/1998 | Vorse et al. |
| 5,755,866 A * | 5/1998 | Bayly et al. ........... 106/287.13 |
| 5,796,117 A | 8/1998 | Larson et al. |
| 5,852,137 A | 12/1998 | Hsieh et al. |
| 5,866,657 A | 2/1999 | Tominaga et al. |
| 5,905,109 A | 5/1999 | Shimizu et al. |
| 5,942,583 A | 8/1999 | Azechi |
| 6,037,008 A * | 3/2000 | Huang et al. ............ 427/387 |

FOREIGN PATENT DOCUMENTS

| | | |
|---|---|---|
| EP | 0 263 893 A1 | 4/1988 |
| EP | 0 585 639 A1 | 3/1994 |
| JP | 52032030 | 3/1977 |

* cited by examiner

Primary Examiner—Robert Dawson
Assistant Examiner—Michael J Feely
(74) Attorney, Agent, or Firm—Burns, Doane, Swecker & Mathis, L.L.P.

(57) ABSTRACT

A method is provided for adhering a polyurethane-based sealant or adhesive to a substrate. The method comprises: i) applying an aqueous primer solution onto a substrate, the primer solution comprising water, an aminotitanate compound, and preferably an epoxysilane compound having at least one epoxy group and at least two alkoxy groups; ii) applying a polyurethane adhesive or sealant to the primer-treated substrate; and iii) forming a reaction product of the primer and the polyurethane. Also provided are a substrate having a layer of a polyurethane adhesive or sealant, and a stabilized aqueous primer solution containing an epoxysilane compound and an aminotitanate compound.

38 Claims, 2 Drawing Sheets

WATER-BASED PRIMER FOR PROMOTING ADHESION OF POLYURETHANE-BASED SEALANTS AND ADHESIVES

BACKGROUND OF THE INVENTION

1. Field of the Invention

The present invention relates to a primer composition which promotes adhesion between a polyurethane-based adhesive or sealant and a substrate.

2. Description of the Related Art

Organo-silicon and organo-titanium coupling agents have been used as adhesion promoters, either mixed directly in a sealant/adhesive formulation or in a primer composition for surface pretreatment prior to application of the sealant/adhesive onto substrate surfaces. Due to their high reactivity and high cost, these coupling agents are generally not suitable for use at high concentrations in sealant/adhesive formulations. On the other hand, for many applications, no significant improvement in adhesion properties of the sealant/adhesive is obtained when only small amounts of the coupling agent are added to the sealant/adhesive composition.

Thus, incorporation of organo-silicon and organo-titanium coupling agents into primer compositions may be a more practical use of those coupling agents. Although the use of primers introduces an additional step in the application of the sealant/adhesive to a substrate, application of primers remains popular due to their powerful adhesion-promoting effect.

Conventional primer compositions based on organo-silicon and/or organo-titanium coupling compounds generally contain a large amount of volatile organic solvents. The organic solvents play a role not only in adjusting the viscosity of the primer composition, but also as stabilizers thereby providing a longer shelf-life of the primer composition.

The solvents used in the formulation of conventional primer compositions are typically volatile organic compounds (VOC). While such compositions provide good adhesion enhancement properties, the release of VOC during the fabrication, storage or use of the primer composition can cause significant harm to the environment. The environmental concerns associated with the use of VOC has prompted the promulgation of government regulations requiring that the use of these compounds be drastically reduced and ultimately eliminated. In view of the regulations against VOC emissions, there has been an increasing effort to develop low VOC and VOC free primer compositions.

The present invention relates to an aqueous primer composition which promotes adhesion of polyurethane adhesives or sealants to a substrate. The primer composition of the invention is stable and gives little or no VOC emissions.

OBJECTS AND SUMMARY OF THE INVENTION

It is an object of the present invention to provide an aqueous primer composition which promotes adhesion of polyurethane adhesives or sealants to a substrate. Preferably, the primer composition is stable and gives little or no VOC emissions.

In one aspect, the invention provides a method of adhering a polyurethane-based sealant or adhesive to a substrate, comprising:
 i) applying an aqueous primer solution onto a substrate, the primer solution comprising water and an aminotitanate compound,;
 ii) applying a polyurethane adhesive or sealant to the primer-treated substrate; and
 iii) forming a reaction product of the primer and the polyurethane.

In another aspect, the invention provides a substrate having thereon a layer of a polyurethane adhesive or sealant, comprising:
 i) a substrate;
 ii) a layer of a polyurethane adhesive or sealant; and
 iii) a primer between the substrate and polyurethane adhesive or sealant, said primer comprising an aminotitanate compound;
 wherein the primer and polyurethane have formed a reaction product.

It is another object of the present invention to provide an aqueous silane-based primer composition which promotes adhesion of polyurethane adhesives or sealants to a substrate. Preferably, the primer composition is stable and gives little or no VOC emissions.

In one aspect, the invention provides a method of adhering a polyurethane-based sealant or adhesive to a substrate, comprising:
 i) applying an aqueous primer solution onto a substrate, the primer solution comprising water, an aminotitanate compound, and an epoxysilane compound having at least one epoxy group and at least two alkoxy groups;
 ii) applying a polyurethane adhesive or sealant to the primer-treated substrate;
 iii) forming a reaction product of the primer and the polyurethane.

In yet another aspect, the invention provides a substrate having thereon a layer of a polyurethane adhesive or sealant, comprising:
 i) a substrate;
 ii) a layer of a polyurethane adhesive or sealant; and
 iii) a primer between the substrate and polyurethane adhesive or sealant, said primer comprising an aminotitanate compound and a siloxane formed from condensation of at least one epoxysilane compound having at least one epoxy group and at least two alkoxy groups;
 wherein said the primer and the polyurethane have formed a reaction product.

In still another aspect, the invention provides an aqueous primer solution comprising an epoxysilane compound having at least one epoxy functional group and at least two alkoxy groups, an aminotitanate compound and water, wherein the epoxy group is hydrolyzable to an ethylene glycol functionality and the aminotitanate compound improves adhesion of a polyurethane adhesive or sealant to a substrate relative to said primer not containing said aminotitanate compound.

DESCRIPTION OF THE PREFERRED EMBODIMENTS

The present invention provides an aqueous primer solution comprising an aminotitanate compound which is useful in the pretreatment of the surface of a substrate prior to the application of polyurethane-based sealants or adhesives onto the substrate. Preferably the aqueous primer solution also contains an epoxysilane compound. The primer solution promotes adhesion between the sealant or adhesive and the surface of the substrate. The primer solution of the invention has long shelf life, preferably without the need for using VOC in the primer solution or in its preparation.

The stable aqueous primer solution of the present invention which is low or free of VOC is advantageous in that the deleterious effects of VOC components on the environment are avoided without sacrificing flexibility in preparing, storing and using the primer solution. Preferably the primer solution has VOC emissions of less than 250 g/l, more preferably no VOC emissions. Furthermore, the flash point of the primer solution is preferably greater than 60° C., more preferably greater than 99° C.

The aqueous primer solution is used to facilitate adhesion of a polyurethane-based sealant or adhesive to a substrate. Any substrate consistent with adhesion to a polyurethane sealant or adhesive is within the scope of the present invention. Preferably the substrate is a silicate base substrate such as float glass or ceramic coated glass (e.g., ceramic frit). Other substrates which may be used in the present invention include glass fiber reinforced plastics (FRP), urethane-painted aluminum and other urethane-painted metal surfaces, epoxy-painted aluminum and other epoxy-painted metal surfaces, and oxidized aluminum and other oxidized metal surfaces including steel and zinc or zinc-alloy coated steel.

Any polyurethane adhesive or sealant compatible with the aqueous primer solution may be used according to the present invention, including polyurethanes which contain prepolymers. The polyurethane adhesive and sealant compositions used in the present invention are generally fast curing, highly viscous, highly thixotropic products. Such products are typically urethane prepolymers filled with heavy carbon black and/or other fillers, and are used for bonding windshields with car bodies or structural bonding of glass to a metallic substrate. Such products include SikaTack®-Ultrafast, SikaTack®-Ultrafast II, SikaTack®-Drive, SikaTack®-PlusBooster, all from Sika, and U-400HV from Essex. U.S. Pat. No. 4,758,648, the contents of which are hereby incorporated by reference, describes how to make various polyurethane adhesives/sealants which may be used in the present invention.

Alkoxysilanes are unstable compounds in water, undergoing rapid hydrolysis to silanols. Hydrolysis of a trialkoxysilane can be depicted as follows:

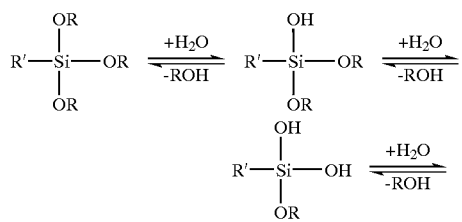

Furthermore, silanols will condense to form siloxanes. For example:

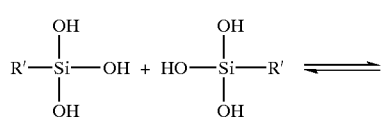

-continued

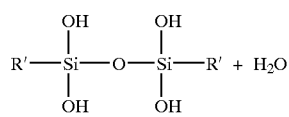

Figure 1:
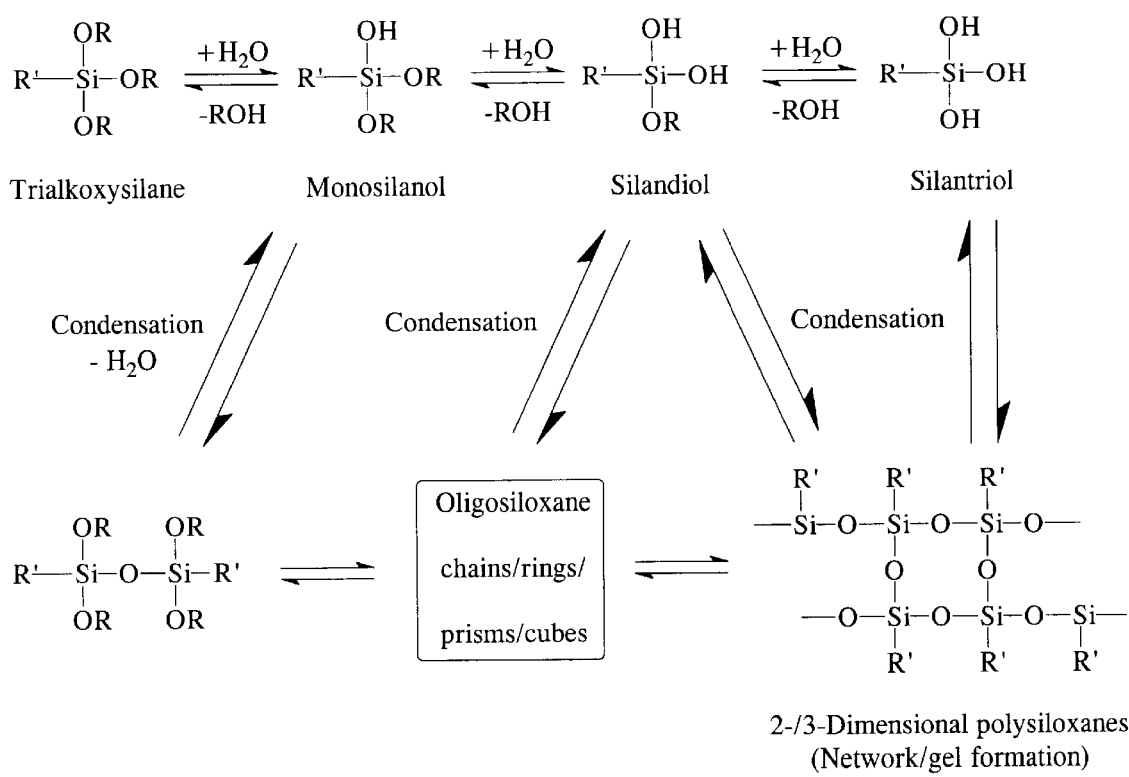
FIG. 1 illustrates the formation of mixed reaction products from silanols.

Under real conditions, silanols will form mixed reaction products as illustrated in FIG. 1.

Figure 2:
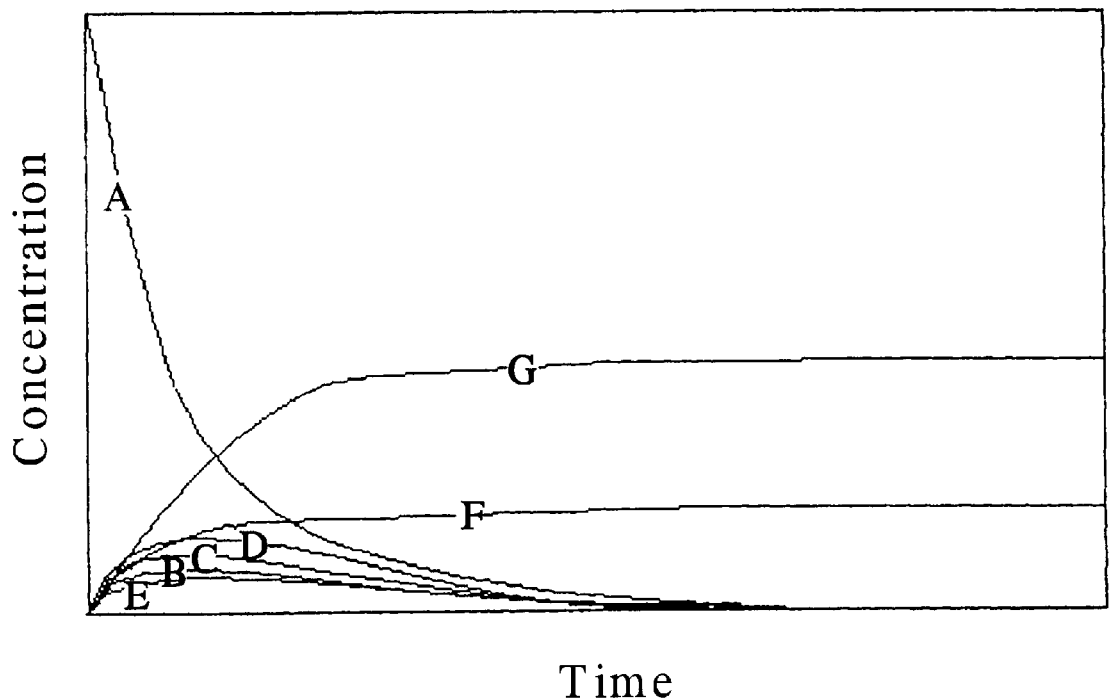
FIG. 2 illustrates the equilibrium involved as alkoxysilanes undergo hydrolysis to silanols, with subsequent formation of various siloxane oligomers.

Thus, when dissolved in water, alkoxysilanes undergo hydrolysis to silanols, with subsequent formation of various siloxane oligomers. As this process approaches equilibrium, alkoxysilanes and silanols will become undetectable and two kinds of siloxane oligomers with different types of supermolecular structure will be found in nearly unchanged concentration. One type of oligomer is a two dimensional oligomer which still contains hydroxyl functionalities. Another type of oligomer is a three dimensional oligomer/polymer which may not contain any hydroxyl functionalities. As long as hydroxyl functionalities are available, the system will remain active as a coupling agent. The various molecules and the equilibrium involved can be depicted in the following illustrations and in FIG. 2, respectively (the letter designations for the molecular structures corresponding to the equilibrium curves depicted in FIG. 2.)

A: Silane (Trialkoxysilane)

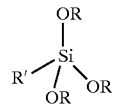

B: Monosilanol

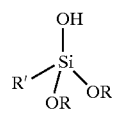

C: Silandiol (Disilanol)

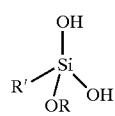

D: Silantriol (Trisilanol)

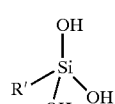

E: One dimensional Structure (M-Structure)

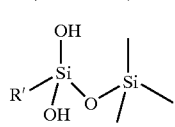

F: Two dimensional oligomers (D-Structure)

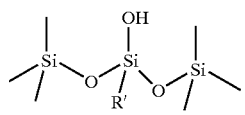

-continued
G: Three dimensional branches oligomers (T-Structure)

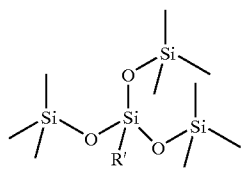

The present inventors have developed a water-based primer composition containing an aminotitanate compound and an epoxysilane, such that a silicon matrix is generated with hydroxyl functionalities to bond to a substrate, for example a silicate-based matrix. The epoxy group of the epoxysilane can generate an ethylene glycol functionality containing hydroxyls for linkage to isocyanate groups of a polyurethane-based adhesive or sealant; hence, the epoxysilane acts as a coupling agent. In addition, hydroxyl functionalities which result from hydrolysis of alkoxy groups of the silane can react with hydroxyl groups available on the substrate surface, such as a silicate-based surface. Furthermore, it is believed that there are cross ester exchange reactions between the epoxysilanes and the aminotitanates.

In addition, the epoxy groups of the epoxysilane can react with an amine functionality, such as from the aminotitanate, to form a hydroxy-amine product. Such hydroxy-amine products can then also couple with a polyurethane through reaction of either the hydroxy or amine functionalities with free isocyanate groups. Formation of the hydroxy-amine products is believed to occur as follows:

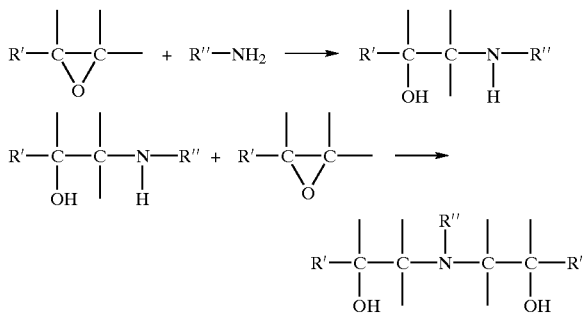

Moreover, in one aspect the present invention is directed to an aqueous primer solution containing an aminotitanate compound but without an epoxysilane. The amino group from the aminotitanate can react with isocyanate groups of the polyurethane, and alkoxy functionalities on the titanium atom of the aminotitanate can react with hydroxyl groups available on the substrate surface. Thus, the aminotitanates alone can also function as coupling agents in the present invention.

The silane compound, which acts as a coupling agent, has at least one epoxy group which can be hydrolyzed to form an ethylene glycol functionality, and also has at least two alkoxy groups which are hydrolyzable in water to hydroxyl groups. Any epoxysilane which allows for binding to a substrate and a polyurethane-based adhesive or sealant is within the scope of the present invention.

Epoxysilanes in which less than two of the alkoxy groups are methoxy groups become difficult to dissolve in water due to their low hydrophilicity, and also have a lower rate of hydrolysis than that of epoxysilanes having at least two methoxy groups. However, such epoxysilanes are useful when it is desirable to reduce the possibility of wet adhesion failures. Epoxysilanes with less than two methoxy groups should generally be used at low concentrations, preferably no higher than 1.0 wt %, more preferably no more than 0.5 wt %. Epoxysilanes belonging to this group include β-(3,4-epoxycyclohexyl)ethyltriethoxysilane, γ-glycidoxypropylmethyldiethoxysilane, γ-glycidoxypropylmethoxydiisopropoxysilane and γ-glycidoxypropyltriisobutoxysilane. Epoxysilanes with at least two methoxy groups can be used at relatively higher concentrations, preferably greater than 1.0 wt %, and more preferably greater than 1.0 wt % and less than 1.5 wt %. Exemplary epoxysilanes having at least two methoxy groups include γ-glycidoxypropyltrimethoxysilane and β-(3,4-epoxycyclohexyl)ethyltrimethoxy-silane.

It has further been determined that a primer composition containing a combination of an epoxysilane and an aminotitanate compound provides a composition with improved adhesion promoting ability. Aminotitanates for use in the present invention include those of the following general structure:

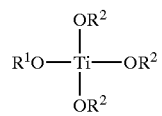

$R^1$ and $R^2$ are alkyl groups, provided that at least one of $R^2$ is substituted with at least one amino group. Generally $R^2$ has more carbon atoms than does $R^1$. $R^1$ and $R^2$ are preferably methyl, ethyl, propyl, isopropyl, butyl or isobutyl. A preferred aminotitanate compound is isopropyltri(N-ethylenediamino)ethyltitanate.

The aqueous primer solution of the invention can be formed by a process which is easy to implement and scaleup. Preferably, the aminotitanate is dissolved in water, preferably distilled or deionized water. The dissolution can be conducted by methods known in the art. Preferred methods include high speed stirring and gentle mixing at temperatures, for example, of up to 60° C. The epoxysilane compound is then added to the water and aminotitanate solution. The epoxysilane is dissolved in the solution using techniques similar to those employed in dissolving the aminotitanate in the water.

The epoxysilane and aminotitanate compounds can be dissolved in water to form a clear and transparent aqueous solution; preferably the weight ratio between aminotitanate and epoxysilane is at least 2:1, more preferably at least 4:1, and most preferably at least 5:1. Epoxysilanes with at least two methoxy groups are preferably dissolved at a proportion of 1.5 parts or less per 100 parts of water, more preferably 1.0 parts or less per 100 parts of water. Epoxysilanes having less than two methoxy groups are preferably dissolved at a proportion of 1.0 parts or less per 100 parts of water, more preferably 0.5 parts or less per 100 parts of water. Epoxysilane compounds with large alkoxy groups are preferably at a proportion of no more than 0.2 parts per 100 parts of water. Aminotitanate compounds are preferably dissolved at a proportion of 10 parts or less, more preferably 5 parts or less, per 100 parts of water.

The aqueous primer solution of the present invention may be applied to a substrate by any appropriate method, including brushing, painting, spraying and wiping on with, for example, an absorbent paper dipped with the primer solution. In the present invention, brushing or painting works well for applying a thin primer layer onto the substrate, such as when applying a primer solution with low concentration of aminotitanate and epoxysilane compounds (see, e.g., Example 2 below). Wiping primer solution onto a substrate surface is effective with a primer solution containing high concentrations of aminotitanate and epoxysilane compounds (See, e.g., Example 3 below). Prior to application of the primer solution, the substrate surface is preferably cleaned in order to obtain the best adhesion performance. Any appropriate cleaning solution may be used. A solution of 2 parts isopropyl alcohol and 1 part water is a typical cleaning agent for glass surfaces, such as car windshields. An aqueous soap solution may also be used for substrate surface cleaning.

It has also been unexpectedly found that the use of an epoxysilane compounds having a hydrophobic character is advantageous in improving the adhesion of the primer solution to certain substrates, especially under wet conditions. For example, a primer solution containing γ-glycidoxypropyltrimethoxysilane is useful for promoting adhesion to float glass, but addition of the more hydrophobic silane γ-glycidoxypropylmethyldiethoxy-silane to a primer solution containing γ-glycidoxypropyltrimethoxysilane provides for much improved adhesion promotion to ceramic coated glass, especially wet adhesion.

The primer solution according to the present invention has high stability during storage and provides excellent adhesion promotion properties when applied to the surface of a substrate prior to applying a polyurethane-based sealant or adhesive to the surface of the substrate. Preferably the primer solution has a shelf life of at least 6 months at 23° C. in a sealed container, more preferably at least 9 months, and most preferably at least 12 months. As used herein, "shelf life" means that the primer solution maintains its function as an adhesion promoter. In addition, the primer solution preferably has a dry time of less than 10 minutes, more preferably less than 3 minutes.

EXAMPLE 1

An example of a polyurethane adhesive formulation for use in the present invention is as follows:

1. Prepolymer composition. A polyether polyol (100 parts) with a OH-number of 42 and an average molecular weight of 4000 (Poly-G 30–42 from Arch) is reacted with 17 parts of molten diphenylmethane-4,4'-diisocyanate (Mondur M from Bayer) at 60° C. for 3–4 hours. The prepolymer has a theoretical final free NCO content of 2.1 %.

2. Adhesive formulation:

| | |
|---|---|
| 250 parts | Prepolymer (described above) |
| 60 parts | Plasticizer (Mesamoll from Bayer) |
| 125 parts | Carbon black (Printex 60 from Degussa) |
| 63 parts | Clay (Whitex from Engelhard) |
| 1 part | Adhesion promoter (Silane A-187 from Witco) |
| 1 part | Catalyst (DABCO T-12 from AirProduct) |

EXAMPLE 2

Isopropyltri(N-ethylenediamino)ethyltitanate (0.88 g) (Ken-React KR44 from Kenrich) was dissolved in 199.12 grams of distilled water. γ-Glycidoxypropyltrimethoxysilane (0.47 g)(Silqest Silane A-187 from Witco) was then added and dissolved to form the primer solution.

Four samples of the primer solution were prepared and aged for varying periods of time and under varying conditions. Sample WP6$^1$ was aged for 7 days at a temperature of 23° C. Sample WP6$^2$ was aged for two months at a temperature of 23° C. Sample WP6$^3$ was aged for twelve months at a temperature of 23° C. Sample WP6$^4$ was subjected to 10 freeze/thaw cycles (−23° C. to 23° C.).

To form Sample WPVI, isopropyltri(N-ethylenediamino) ethyltitanate (1 g) was dissolved in 198 grams of distilled water. γ-Glycidoxypropyltrimethoxysilane) (1 g) and γ-glycidoxypropylmethyldiethoxysilane (0.5 g) were then added and dissolved.

The substrates were pretreated by wiping with a mixture of isopropyl alcohol (IPA) and $H_2O$. After drying, thin layers of the various primer solutions were brushed onto to the substrates at room temperature.

The adhesion properties of the primer samples were tested as follows. Each primer sample was applied to the surface of a float glass substrate (Samples WP6$^1$, WP6$^2$, WP6$^3$ and WP6$^4$) or a ceramic coated glass substrate (GM Frit)(Sample WPVI). A few minutes was allowed to lapse for "flashing off" of volatile substances, i.e. water, from the applied primer. Then beads of a urethane adhesive (SikaTack®-Ultrafast) were applied onto the primer-treated substrate. The coating was maintained for 7 days at a temperature of 23° C. The coating was then maintained in water for another 7 days at 23° C., and finally subjected to 100% relative humidity (RH) at 70° C. for a final period of 7 days. After each of these intervals, the cured urethane bead was tested for adhesion.

Table I lists the results of adhesion testing for the five samples. The scale of the test (pull adhesion rating number) is as follows: 1 indicates over 95% cohesive break, 2 indicates over 75% cohesive break, 3 indicates over 25% cohesive break, 4 indicates less than 25% cohesive break and 5 indicates 100% adhesive break. The results are presented in sets of three numbers. The numbers indicate the test results obtained at the end of the successive 7 day periods of maintaining the coating on the surface of the substrate as discussed above.

TABLE I

Test Results after 7 days at 23° C. + 7 days in $H_2O$ + 7 days/70° C./100% RH

| Substrate | Pretreatment | Primer* | Results** | Control (No priming) |
|---|---|---|---|---|
| Float glass | IPA/$H_2O$ | WP6$^1$ | 1/1/1 | 3/3/5 |
| Float glass | IPA/$H_2O$ | WP6$^2$ | 1/1/1 | 5/5/5 |
| Float glass | IPA/$H_2O$ | WP6$^3$ | 1/1/1 | 5/5/5 |
| Float glass | IPA/$H_2O$ | WP6$^4$ | 1/1/1 | 5/5/5 |
| GM Frit (Chevy truck) | None | WPVI | 1/1/1 | 5/5/5 |

The results shown in Table I indicate that the solutions of the invention provide dramatic enhancement of the adhesive properties between a substrate and a sealant/adhesive. While the control tests conducted without application of a primer showed little or no adhesion at all, all the tests conducted with the primer solutions according to the invention showed excellent adhesion properties.

EXAMPLE 3

This example was performed under the same conditions as Example 2 with the following exceptions.

To form the aqueous primer solution, isopropyltri(N-ethylenediamino)ethyltitanate (5.09 g) (Ken-React KR44 from Kenrich) was dissolved in 100 grams of distilled water. γ-Glycidoxypropyltrimethoxysilane (1.33 g)(Silquest Silane A-187 from Witco) and γ-glycidoxypropylmethyldiethoxysilane (1.01 g)(Silquest Silane Y-15078 from Witco) were then added and dissolved.

Primer solution was wiped onto substrate through use of an absorbent paper dipped with primer solution. The adhesive tested was SikaTack®-Ultrafast.

The primer/adhesive-treated substrate was maintained for 7 days at a temperature of 23° C. The coating was then maintained in water for another 7 days at 23° C., and finally subjected to 100% relative humidity (RH) at 70° C. for a final period of 7 days. After each of these intervals, the cured urethane bead was tested for adhesion. Table II lists the results of adhesion testing for the samples.

TABLE II

Test Results after 7 days at 23° C. + 7 days in H₂O +
7 days/70° C./100% RH

| Substrate | Pre-Cleaning | Primer* | Results** |
|---|---|---|---|
| GM Frit (Chevy truck) | None | No | 5/5/4 |
| GM Frit (Chevy truck) | None | Yes | 1-2/1/1 |
| PPG Frit (Cadillac DeVille) | None | No | 4-5/5/4 |
| PPG Frit (Cadillac DeVille) | None | Yes | 1-2/2/1 |
| BMW Frit | None | No | 5/5/1-2 |
| BMW Frit | None | Yes | 1/1/1 |

While the invention has been described in terms of preferred embodiments, the skilled artisan will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. A method of adhering a polyurethane-based sealant or adhesive to a substrate, comprising:
   i) applying an aqueous primer solution onto a substrate, the primer solution comprising water, an aminotitanate compound, and an epoxysilane compound having at least one epoxy group and at least two alkoxy groups;
   ii) applying a polyurethane adhesive or sealant to the primer-treated substrate; and
   iii) forming a reaction product of the primer and the polyurethane.

2. The method according to claim 1, wherein said reaction product comprises at least one covalent bond between at least one isocyanate group of the polyurethane and at least one hydroxyl of an ethylene glycol functionality which results from hydrolysis of an epoxy group of the epoxysilane.

3. The method according to claim 2, wherein said reaction product comprises at least one covalent bond between the substrate and at least one hydroxy functionality which results from hydrolysis of an alkoxy group of the epoxysilane.

4. The method according to claim 1, wherein said reaction product comprises at least one covalent bond between the aminotitanate compound and at least one isocyanate group of the polyurethane.

5. The method according to claim 4, wherein said reaction product comprises at least one covalent bond between the substrate and the aminotitanate compound.

6. The method according to claim 1, wherein the epoxy silane compound and the aminotitanate compound have reacted to form a hydroxy-amine product, and said reaction product comprises at least one covalent bond between at least one isocyanate group of the polyurethane and at least one hydroxy or amine functionality of the hydroxy-amine product.

7. The method according to claim 1, wherein the substrate is a silicate- based substrate.

8. The method according to claim 7, wherein the substrate is float glass.

9. The method according to claim 7, wherein the substrate is ceramic coated glass.

10. The method according to claim 1, wherein the polyurethane adhesive or sealant comprises a prepolymer.

11. The method according to claim 1, wherein the aminotitanate compound is an adhesion promoter for the substrate and the polyurethane adhesive or sealant.

12. A substrate having thereon a layer of a polyurethane adhesive or sealant, comprising:
   i) a substrate;
   ii) a layer of a polyurethane adhesive or sealant; and
   iii) a primer between the substrate and polyurethane adhesive or sealant, said primer comprising an aminotitanate adhesion promoter and a siloxane formed from condensation of at least one epoxysilane compound having at least one epoxy group and at least two alkoxy groups;
   wherein the polyurethane and the primer have formed a reaction product.

13. The substrate according to claim 12, wherein said reaction product comprises at least one covalent bond between at least one isocyanate group of the polyurethane and at least one hydroxyl of an ethylene glycol functionality which results from hydrolysis of an epoxy group of the epoxysilane.

14. The substrate according to claim 13, wherein said reaction product comprises at least one covalent bond between the substrate and at least one hydroxy functionality which results from hydrolysis of an alkoxy group of the epoxysilane.

15. The substrate according to claim 12, wherein said reaction product comprises at least one covalent bond between the aminotitanate compound and at least one isocyanate group of the polyurethane.

16. The substrate according to claim 15, wherein said reaction product comprises at least one covalent bond between the substrate and the aminotitanate compound.

17. The substrate according to claim 12, wherein the epoxysilane compound and the aminotitanate compound have reacted to form a hydroxy-amine product, and said reaction product comprises at least one covalent bond between at least one isocyanate group of the polyurethane and at least one hydroxy or amine functionality of the hydroxy-amine product.

18. The substrate according to claim 12, wherein the substrate is a silicate-based substrate.

19. The substrate according to claim 18, wherein the substrate is float glass.

20. The substrate according to claim 18, wherein the substrate is ceramic coated glass.

21. The substrate according to claim 12, wherein the polyurethane adhesive or sealant comprises a prepolymer.

22. An aqueous primer solution comprising an epoxysilane compound having at least one epoxy functional group and at least two alkoxy groups, an aminotitanate compound and water, wherein the epoxy group is hydrolyzable to ethylene glycol functionality and the aminotitanate compound improves adhesion of a polyurethane adhesive or sealant to a substrate relative to said primer not containing said aminotitanate compound.

23. The aqueous primer solution of claim 22, wherein the epoxysilane compound is capable of forming a reaction product with a polyurethane adhesive or sealant applied to a substrate pretreated with the primer solution by forming a covalent bond between at least one isocyanate group of the polyurethane and at least one hydroxyl of an ethylene glycol functionality which results from hydrolysis of an epoxy group of the epoxysilane.

24. The aqueous primer solution of claim 23, wherein said reaction product comprises at least one covalent bond between the substrate and at least one hydroxy functionality which results from hydrolysis of an alkoxy group of the epoxysilane.

25. The aqueous primer solution of claim 22, wherein the aminotitanate compound is capable of forming a reaction product with a polyurethane adhesive or sealant applied to a substrate pretreated with the primer solution by forming a covalent bond between the aminotitanate compound and at least one isocyanate group of the polyurethane.

26. The aqueous primer solution of claim 25, wherein said reaction product comprises at least one covalent bond between the substrate and the aminotitanate compound.

27. The aqueous primer solution of claim 22, wherein the epoxysilane compound and the aminotitanate compound are capable of reacting to form a hydroxy-amine product, and the hydroxy-amine product is capable of forming a reaction product with a polyurethane adhesive or sealant applied to a substrate pretreated with the primer solution by forming at least one covalent bond between at least one isocyanate group of the polyurethane and at least one hydroxy or amine functionality of the hydroxy-amine product.

28. The aqueous primer solution of claim 22, wherein the solution has a shelf life of at least 6 months at 23° C. in a sealed container.

29. The aqueous primer solution of claim 22, wherein the solution has a shelf life of at least 9 months at 23° C. in a sealed container.

30. The aqueous solution of claim 22, wherein the epoxysilane compound is γ-glycidoxypropyltrimethoxysilane or γ-glycidoxypropylmethyldiethoxysilane.

31. The aqueous solution of claim 22, wherein the aminotitanate compound is isopropyl(N-ethylenediamino) ethyltitanate.

32. A method of adhering a polyurethane-based sealant or adhesive to a substrate, comprising:

i) applying an aqueous primer solution onto a substrate, the primer solution comprising water and an aminotitanate compound;

ii) applying a polyurethane adhesive or sealant to the primer-treated substrate; and iii) forming a reaction product of the primer and the polyurethane.

33. The method according to claim 32, wherein said reaction product comprises at least one covalent bond between the aminotitanate compound and at least one isocyanate group of the polyurethane.

34. The method according to claim 33, wherein said reaction product comprises at least one covalent bond between the substrate and the aminotitanate compound.

35. The method according to claim 32, wherein the aminotitanate compound is an adhesion promoter for the substrate and the polyurethane adhesive or sealant.

36. A substrate having thereon a layer of a polyurethane adhesive or sealant, comprising:

i) a substrate;

ii) a layer of a polyurethane adhesive or sealant; and iii) a primer between the substrate and polyurethane adhesive or sealant, said primer comprising an aminotitanate adhesion promoter;

wherein the polyurethane and the primer have formed a reaction product.

37. The substrate according to claim 36, wherein said reaction product comprises at least one covalent bond between the aminotitanate compound and at least one isocyanate group of the polyurethane.

38. The substrate according to claim 37, wherein said reaction product comprises at least one covalent bond between the substrate and the aminotitanate compound.

* * * * *